US009552264B1

(12) United States Patent
DeVilbiss et al.

(10) Patent No.: US 9,552,264 B1
(45) Date of Patent: *Jan. 24, 2017

(54) SERVER-SIDE FAILOVER BETWEEN DEDICATED VNIC SERVERS (71) Applicant: International Business Machines Corporation, Armonk, NY (US)

(72) Inventors: Colin R. DeVilbiss, Rochester, MN (US); Charles S. Graham, Rochester, MN (US); Nicholas J. Rogness, Rochester, MN (US); Kristopher C. Whitney, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/057,780

(22) Filed: Mar. 1, 2016

Related U.S. Application Data (63) Continuation of application No. 14/954,421, filed on Nov. 30, 2015.

(51) Int. Cl.
*G06F 9/50* (2006.01)
*G06F 9/54* (2006.01)
*H04L 12/26* (2006.01)
*G06F 15/173* (2006.01)
*G06F 11/20* (2006.01)
*H04L 29/06* (2006.01)

(52) U.S. Cl.
CPC ........... *G06F 11/2033* (2013.01); *H04L 67/42* (2013.01); *G06F 2201/805* (2013.01); *G06F 2201/815* (2013.01)

(58) Field of Classification Search
CPC ........... G06F 9/5077; G06F 9/545; G06F 9/54

USPC .......................................................... 709/224
See application file for complete search history.

(56) References Cited

U.S. PATENT DOCUMENTS 7,783,788 B1  8/2010  Quinn et al.
7,860,097 B1  12/2010 Lovett et al.
8,285,881 B2  10/2012 Elzur
(Continued)

OTHER PUBLICATIONS

DeVilbiss et al., "Server-Side Failover Between Dedicated VNIC Servers" U.S. Appl. No. 14/954,421, filed Nov. 30, 2015.
(Continued)

*Primary Examiner* — Suraj Joshi
(74) *Attorney, Agent, or Firm* — Martin & Associates, LLC; Derek P. Martin (57) ABSTRACT

Virtual Network Interface Connection (VNIC) is a client-server protocol that virtualizes access to a single physical Ethernet network adapter. "Dedicated VNIC" describes a configuration where a VNIC server is connected to a single VNIC client via a command/response queue (CRQ), allowing minimal overhead when communicating between the client and the Ethernet network adapter. A VNIC server failover mechanism includes multiple VNIC servers on a prioritized list. The top VNIC server on the prioritized list is selected to serve a VNIC client when a CRQ is opened by the client. When the selected VNIC server stops working, the VNIC server failover mechanism selects the next VNIC client in the prioritized list as the active VNIC server, and establishes a connection to the VNIC client's CRQ. In this manner, recovery of a failure in a VNIC server is done in a way that does not require any changes to the VNIC client.

9 Claims, 8 Drawing Sheets (56) References Cited

U.S. PATENT DOCUMENTS

| | | |
|---|---|---|
| 8,561,065 B2 | 10/2013 | Cunningham et al. |
| 8,561,066 B2 | 10/2013 | Koch et al. |
| 8,788,873 B2 | 7/2014 | Galles et al. |
| 8,839,240 B2 | 9/2014 | Barrett et al. |
| 8,881,141 B2 | 11/2014 | Koch et al. |
| 2012/0151472 A1* | 6/2012 | Koch ................. G06F 9/45558 718/1 |
| 2013/0138836 A1 | 5/2013 | Cohen et al. |
| 2014/0298327 A1 | 10/2014 | Khatri et al. |
| 2015/0149813 A1* | 5/2015 | Mizuno .............. G06F 11/2028 714/4.11 |

OTHER PUBLICATIONS

Appendix P—List of IBM Patents or Patent Applications Treated as Related.

Tripathi et al., "Crossbow Virtual Wire: Network in a Box", LISA '09: 23rd Large Installation System Administration Conference, pp. 47-63, 2009.

* cited by examiner

SERVER-SIDE FAILOVER BETWEEN DEDICATED VNIC SERVERS

BACKGROUND

1. Technical Field

This disclosure generally relates to virtualization in computer systems, and more specifically relates to failover in virtualized network communications.

2. Background Art

A physical server computer system can be configured into multiple logical partitions that provide the appearance of separate computer systems. A logically partitioned computer system can thus serve many different clients through separate logical partitions. A logically partitioned computer system typically includes a partition manager, known as a hypervisor in IBM parlance, which allocates and manages hardware resources such as processors, memory, disk, and I/O adapters in the various logical partitions. Once the logical partitions are created with the allocated hardware, an operating system is then installed in each logical partition, which provides the appearance of separate computer systems for all practical purposes.

The concept of virtualization supports logically partitioning a computer system. A physical CPU can thus be allocated to a logical partition as a virtual CPU. Similarly, other hardware resources, such as memory and I/O adapters, can be virtualized to a logical partition, thus giving the appearance to the operating system that is has physical hardware for these resources. The hypervisor sets up and manages the virtualized resources in a way that the operating system within a logical partition can't tell the difference between running on a stand-alone computer system and running on a virtual partition.

Network adapters are resources that are typically virtualized in a logically partitioned computer system. Many virtual network adapters in different logical partitions can be virtualized to a single hardware network adapter. Virtual network adapters are also an important part of communicating between logical partitions. Because an operating system can communicate with other computer systems over a network, an operating system in a logical partition can use a virtual network adapter to communicate with other logical partitions over a virtual local area network (VLAN).

An IBM product known as Shared Ethernet Adapter (SEA) is a specific instance of an Ethernet layer-2 bridge that allows sharing a physical Ethernet adapter between logical partitions. A server partition has a connection to a physical network adapter that has a connection to a physical network, and creates a virtual Ethernet adapter which communicates with a virtual Ethernet adapter in a client partition. When an application in the client partition needs to communicate to the physical network, the application sends network packets to the virtual network adapter in the client partition, which sends the network packets to the virtual network adapter in the virtual I/O server (VIOS) partition. Bridging code in the VIOS partition inspects the packets, then determines they are intended for the physical network, so the bridging code copies the packets to the physical Ethernet adapter. The copying of packets by the bridging code requires considerable overhead in the server partition, which adds delay to virtualized network connections that use SEA.

BRIEF SUMMARY

Virtual Network Interface Connection (VNIC) is a client-server protocol that virtualizes access to a single physical Ethernet network adapter. "Dedicated VNIC" describes a configuration in which a VNIC server is connected to a single VNIC client via a command/response queue (CRQ), allowing minimal overhead when communicating between the client and the Ethernet network adapter. A VNIC server failover mechanism includes multiple VNIC servers on a prioritized list. The top VNIC server on the prioritized list is selected to serve a VNIC client when a command/response queue (CRQ) is opened by the client. When the selected VNIC server stops working, the VNIC server failover mechanism selects the next VNIC client in the prioritized list as the active VNIC server, and establishes a connection to the VNIC client's CRQ. In this manner, recovery of a failure in a VNIC server is done in a way that does not require any changes to the VNIC client.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and.

DETAILED DESCRIPTION

Virtual Network Interface Connection (VNIC) is a client-server protocol that virtualizes access to a single physical Ethernet network adapter. "Dedicated VNIC" describes a configuration in which a VNIC server is connected to a single VNIC client via a command/response queue (CRQ), allowing minimal overhead when communicating between the client and the Ethernet network adapter. A VNIC server failover mechanism includes multiple VNIC servers on a prioritized list. The top VNIC server on the prioritized list is selected to serve a VNIC client when a command/response queue (CRQ) is opened by the client. When the selected VNIC server stops working, the VNIC server failover mechanism selects the next VNIC client in the prioritized list as the active VNIC server, and establishes a connection to the VNIC client's CRQ. In this manner, recovery of a failure in a VNIC server is done in a way that does not require any changes to the VNIC client.

Figure 1:
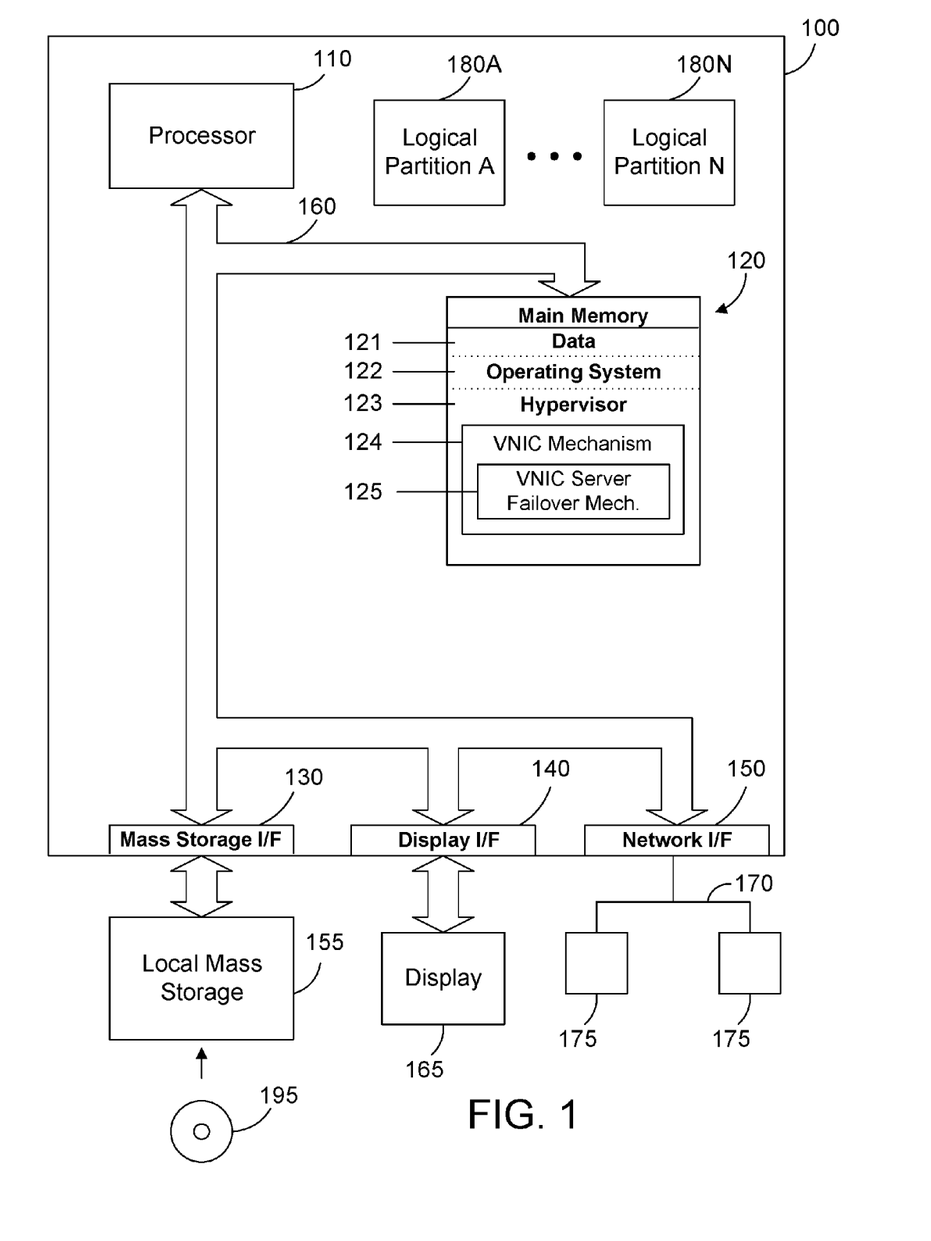
FIG. 1 is a block diagram of an apparatus that includes a VNIC server failover mechanism.

Referring to FIG. 1, a computer system 100 is one suitable implementation of a server computer system that includes a VNIC server failover mechanism as described in more detail below. Server computer system 100 is an IBM POWER8 computer system. However, those skilled in the art will appreciate that the disclosure herein applies equally to any computer system, regardless of whether the computer system is a complicated multi-user computing apparatus, a single user workstation, a laptop computer system, a tablet computer, a phone, or an embedded control system. As shown in FIG. 1, computer system 100 comprises one or more processors 110, a main memory 120, a mass storage interface 130, a display interface 140, and a network interface 150. These system components are interconnected through the use of a system bus 160. Mass storage interface 130 is used to connect mass storage devices, such as local mass storage device 155, to computer system 100. One specific type of local mass storage device 155 is a readable and writable CD-RW drive, which may store data to and read data from a CD-RW 195. Another suitable type of local mass storage device 155 is a card reader that receives a removable memory card, such as an SD card, and performs reads and writes to the removable memory. Yet another suitable type of local mass storage device 155 is a thumb drive.

Main memory 120 preferably contains data 121, an operating system 122, and a hypervisor 123. Data 121 represents any data that serves as input to or output from any program in computer system 100. Operating system 122 is a multi-tasking operating system that supports virtualization, such as AIX or LINUX. Hypervisor 123 creates and manages logical partitions. The term "hypervisor" is a term used by IBM to describe a partition manager, but this term is used herein in a broad sense herein to mean any suitable mechanism for creating and maintaining logical partitions, such as logical partitions 180A, . . . , 180N shown in FIG. 1. The hypervisor 124 includes a VNIC mechanism 124 that can provide a dedicated VNIC connection between a VNIC client and a VNIC server. The VNIC server failover mechanism 125 provides server-side failover of a VNIC server in a way that does not require any changes to the VNIC client.

Computer system 100 utilizes well known virtual addressing mechanisms that allow the programs of computer system 100 to behave as if they only have access to a large, contiguous address space instead of access to multiple, smaller storage entities such as main memory 120 and local mass storage device 155. Therefore, while data 121, operating system 122, and hypervisor 123 are shown to reside in main memory 120, those skilled in the art will recognize that these items are not necessarily all completely contained in main memory 120 at the same time. It should also be noted that the term "memory" is used herein generically to refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122. Processor 110 also executes the hypervisor 123.

Although computer system 100 is shown to contain only a single processor and a single system bus, those skilled in the art will appreciate that a VNIC server failover mechanism as described herein may be practiced using a computer system that has multiple processors and/or multiple buses. In addition, the interfaces that are used preferably each include separate, fully programmed microprocessors that are used to off-load compute-intensive processing from processor 110. However, those skilled in the art will appreciate that these functions may be performed using I/O adapters as well.

Display interface 140 is used to directly connect one or more displays 165 to computer system 100. These displays 165, which may be non-intelligent (i.e., dumb) terminals or fully programmable workstations, are used to provide system administrators and users the ability to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect computer system 100 to other computer systems or workstations 175 via network 170. Network interface 150 broadly represents any suitable way to interconnect electronic devices, regardless of whether the network 170 comprises present-day analog and/or digital techniques or via some networking mechanism of the future. Network interface 150 preferably includes a combination of hardware and software that allows communicating on the network 170. Software in the network interface 150 preferably includes a communication manager that manages communication with other computer systems 175 via network 170 using a suitable network protocol. Many different network protocols can be used to implement a network. These protocols are specialized computer programs that allow computers to communicate across a network. TCP/IP (Transmission Control Protocol/Internet Protocol) is an example of a suitable network protocol that may be used by the communication manager within the network interface 150. In one suitable implementation, the network interface 150 is a physical Ethernet adapter.

Figure 2:
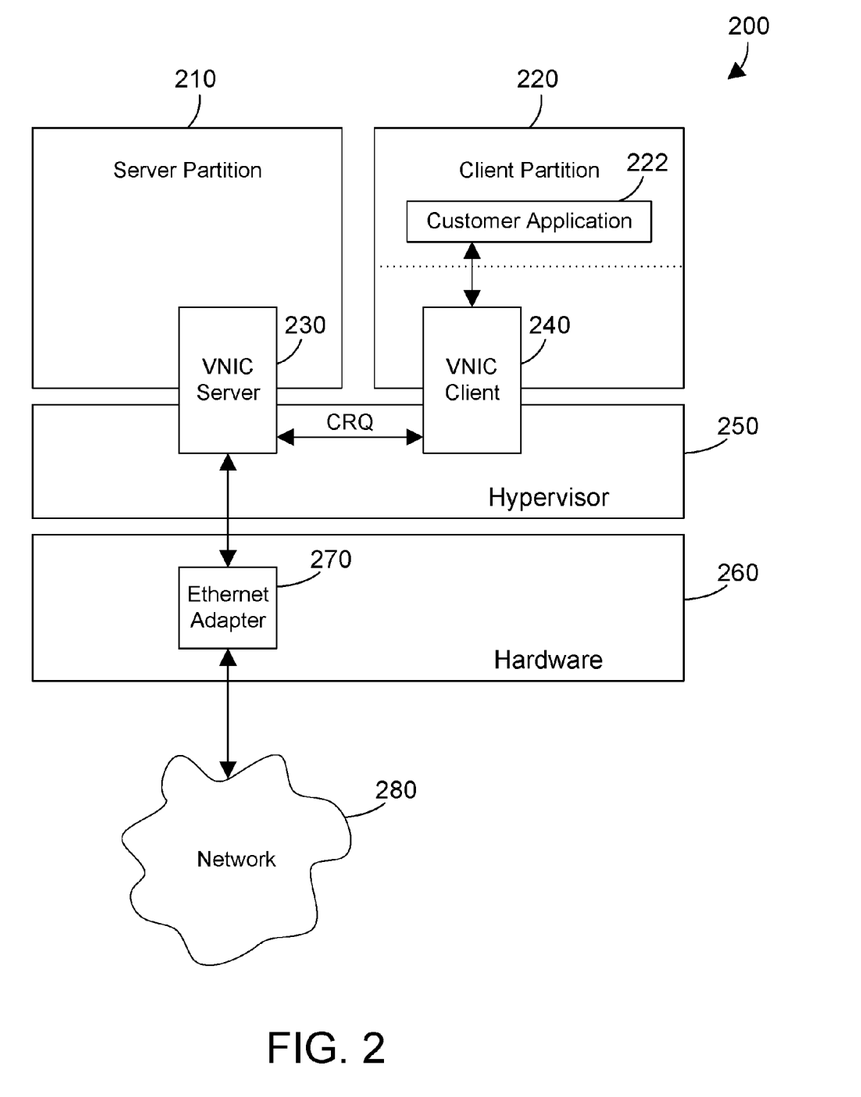
FIG. 2 is a block diagram showing a dedicated VNIC connection between a VNIC client and a VNIC server.

Referring to FIG. 2, a computer system 200 is shown to illustrate a dedicated VNIC configuration. Computer system 200 may be implemented on the hardware shown in computer system 100 in FIG. 1. Computer system 200 includes a server partition 210, a client partition 220, a hypervisor 250, and the physical hardware 260. An Ethernet adapter 270 in the physical hardware 260 is one suitable implementation for the network interface 150 shown in FIG. 1. The Ethernet adapter 270 has a connection to a network 280 and to a VNIC server 230 in the server partition 210. A VNIC client 240 for the client partition 220 communicates with the VNIC server 230 via a command/response queue (CRQ). Once the VNIC client 240 has the CRQ established with the VNIC server, 230, a customer application 222 can communicate with the network 280 via the VNIC client 240 and VNIC server 230 and Ethernet adapter 270 without the overhead of inspecting packets and copying packets. This gives Dedicated VNIC performance that approaches the native performance of communicating directly with the Ethernet adapter. Note the customer application 222 is shown in FIG. 2 running in a non-protected portion of client partition 220 that is separated by the dotted line from a privileged, protection portion that runs the VNIC client 240.

Figure 3:
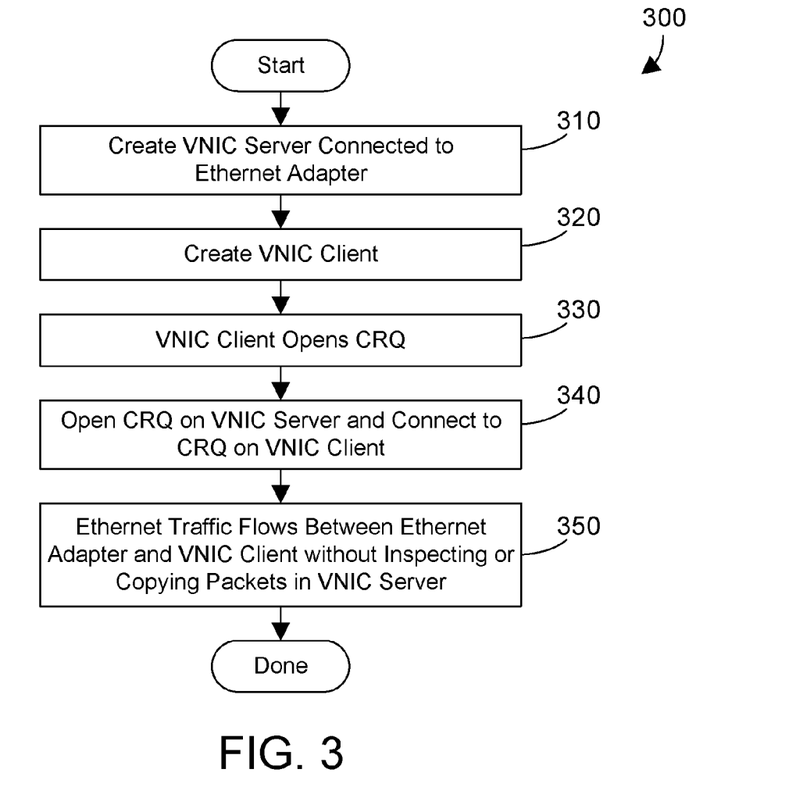
FIG. 3 is a flow diagram of a method for providing a virtual network connection to a VNIC client using dedicated VNIC as shown in FIG. 2.

Referring to FIG. 3, a method 300 is preferably performed by the VNIC mechanism 124 shown in FIG. 1 to create the Dedicated VNIC configuration shown in FIG. 2. The hypervisor creates the VNIC server connected to the Ethernet adapter (step 310). The hypervisor then creates the VNIC client (step 320). The VNIC client opens the CRQ (step 330). In response, the hypervisor opens the CRQ on the VNIC server and connects the CRQ on the VNIC server to the CRQ in the VNIC client (step 340). Ethernet traffic then flows between the Ethernet adapter and the VNIC client without inspecting or copying packets in the VNIC server (step 350). Method 300 is then done.

Figure 4:
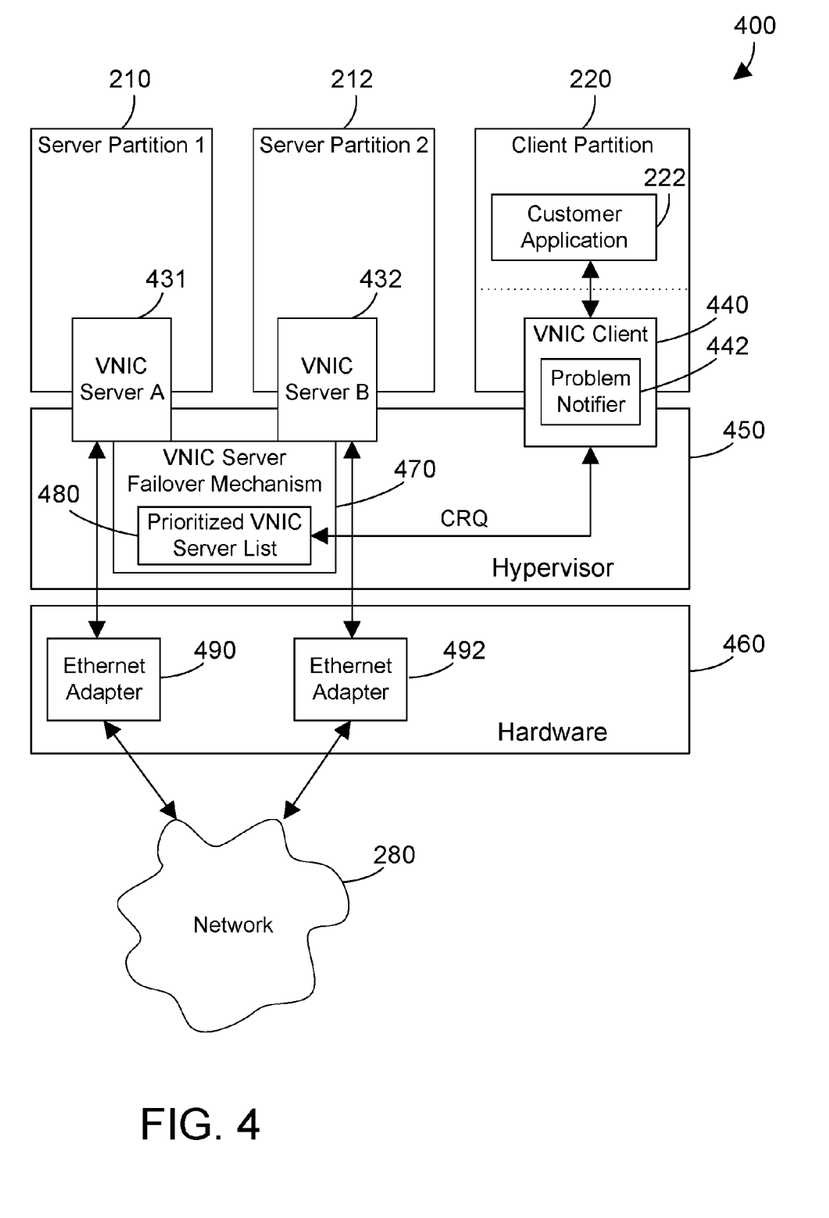
FIG. 4 is a block diagram showing a dedicated VNIC connection between a VNIC client and one of multiple VNIC servers using the VNIC server failover mechanism.

Referring to FIG. 4, computer system 400 provides a dedicated VNIC system with server-side failover as disclosed and claimed herein. Computer system 400 includes a client partition 220 with a customer application 222 that communicates with a VNIC client 440. The VNIC client 440 includes a problem notifier 442 that notifies the hypervisor 450 when the client detects a problem with connecting to the network 280. The VNIC server failover mechanism 470 includes a prioritized VNIC server list 480 that includes multiple VNIC servers such as VNIC server A 431 in server partition 1 210 and VNIC server B 432 in server partition 2 212. VNIC server failover mechanism 470 is one suitable example of VNIC server failover mechanism 125 shown in FIG. 1. When the VNIC client 440 opens the CRQ, the hypervisor selects the highest server on the prioritized VNIC server list 480 that is active and opens the CRQ of the selected VNIC server to the CRQ of the VNIC client 442. Let's assume that initially VNIC server A 431 is the highest VNIC server on the prioritized VNIC server list 480, so that when the VNIC client opens its CRQ, the hypervisor selects VNIC server A 431 and opens its CRQ to the CRQ of the VNIC client 440. The customer application 222 can then communicate with via the VNIC client 440 and its CRQ with VNIC server A 431 to Ethernet adapter 490 in the hardware 460 to network 280. Now let's assume that VNIC server A 431 encounters a problem and stops functioning properly. In response, the hypervisor selects the next VNIC server from the prioritized VNIC server list 470, which we assume is VNIC server B 432. The hypervisor connects the CRQ of VNIC server B 432 to the CRQ of the VNIC client 440. In addition the hypervisor 450 connects VNIC server B 432 to the Ethernet adapter 492. In this manner, after failure of VNIC server A 431 is detected, the VNIC server failover mechanism 470 automatically changes to VNIC server B so the communication between the VNIC client 440 and network 280 can continue without any action required by the VNIC client. By providing server-side failover of VNIC servers, the VNIC client 440 does not require any changes to continue functioning before and after failure of a VNIC server. One change that could be optionally included in the VNIC client 440 is to include a problem notifier 442 that can inform the hypervisor when the VNIC client detects a problem communicating with network 280. There are some types of errors in network communications that would not be detected by the VNIC server or by the hypervisor but would be detected by the client. When the VNIC client 440 detects a problem with communicating with network 280, the problem notifier 442 can notify the hypervisor 450. The hypervisor can then take appropriate action, as discussed in more detail below.

Figure 5:
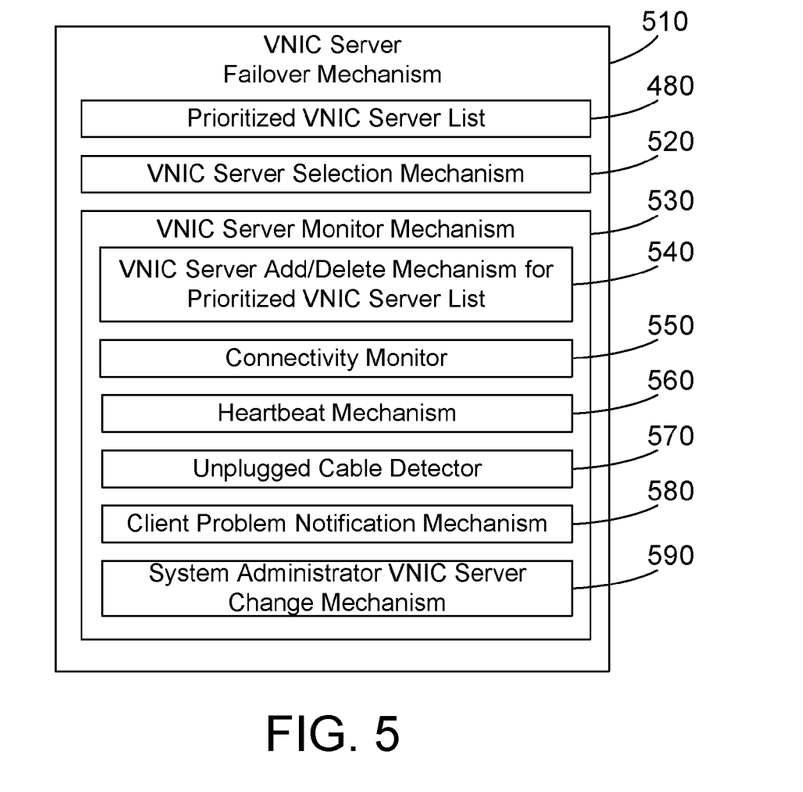
FIG. 5 is a block diagram showing possible components in the VNIC server failover mechanism.

One specific implementation of the VNIC server failover mechanisms 125 in FIG. 1 and 470 in FIG. 4 is shown as VNIC server failover mechanism 510 in FIG. 5. The VNIC server failover mechanism 510 includes a prioritized VNIC server list 480, as shown in FIG. 4. VNIC server failover mechanism 510 additionally includes a VNIC server selection mechanism 520 and a VNIC server monitor mechanism 530. The VNIC server selection mechanism 520 selects the highest VNIC server on the prioritized VNIC server list 480 when a CRQ is opened by a VNIC client. The VNIC server monitor mechanism 530 includes a VNIC server add/delete mechanism for the prioritized VNIC server list 540, a connectivity monitor 550, a heartbeat mechanism 560, an unplugged cable detector 570, a client problem notification mechanism 580, and a system administrator VNIC server change mechanism 590. The VNIC server add/delete mechanism for prioritized VNIC server list 540 determines when VNIC servers should be added or deleted from the prioritized VNIC server list according to any suitable criteria. For example, a VNIC server could be added to the prioritized VNIC server list 480 when the VNIC server first comes up and becomes available. A VNIC server could be deleted from the prioritized VNIC server list 480 when the VNIC server is no longer functioning properly. The connectivity monitor 550 monitors the connection between the VNIC servers and the hypervisor. When the hypervisor no longer has connectivity with a VNIC server, the connectivity monitor 550 detects this change. In response, if the loss of connectivity was to the VNIC server that was the currently-selected VNIC server (i.e., at the top of the prioritized VNIC server list), the VNIC server selection mechanism 520 can select the next VNIC server on the prioritized VNIC server list 480 as the active VNIC server. If the loss of connectivity was to a VNIC server on the prioritized VNIC server list 480 that is not the currently-selected VNIC server, the VNIC server add/delete mechanism for prioritized VNIC server list 540 could delete the VNIC server from the prioritized VNIC server list 480.

The heartbeat mechanism 560 is a way to monitor VNIC servers. In one specific implementation, the heartbeat mechanism 560 passively monitors for heartbeat messages from each VNIC server. Each VNIC server is programmed to provide a defined heartbeat message to the heartbeat mechanism 560 on a periodic basis. If a heartbeat message is not received from a VNIC server, the heartbeat mechanism 560 knows the VNIC server is not functioning properly. In response to the heartbeat mechanism 560 detecting the lack of a heartbeat from a VNIC server, the response depends on whether the VNIC server in question is the currently-selected VNIC server, or is a VNIC server lower on the prioritized VNIC server list 480. When the VNIC server that failed to provide the heartbeat response is the currently-selected VNIC server, the VNIC server selection mechanism 520 can select the next VNIC server on the prioritized VNIC server list 480 as the active VNIC server. When the VNIC server that failed to provide the heartbeat response is not the currently-selected VNIC server, the VNIC server add/delete mechanism for prioritized VNIC server list 540 could delete the VNIC server from the prioritized VNIC server list 480.

The unplugged cable detector 570 detects when a cable is unplugged. In response, the VNIC server monitor mechanism 530 can take action to select the next VNIC server when the unplugged cable affects the selected VNIC server, or can delete a VNIC server affected by the unplugged cable that is lower on the prioritized VNIC server list 480.

The client problem notification mechanism 580 receives notification from a client when the client detects a problem when trying to communicate via the network. Note that most of the problems detected by the client would also be known to the VNIC server monitor mechanism 530. However, there are some types of problems that the client can see that are not visible to the VNIC server monitor mechanism. The VNIC client 440 preferably includes a problem notifier 442 as shown in FIG. 4 that sends a message to the client problem notification mechanism 580 shown in FIG. 5 to make the VNIC server monitor mechanism 530 aware of the problem the client sees. In response, the VNIC server selection mechanism 520 could select the next VNIC server on the prioritized VNIC server list 480 as the active VNIC server to see if using a different VNIC server clears up the problem seen by the client.

The system administrator VNIC server change mechanism 590 provides a way for a system administrator to dictate when a VNIC server should be selected or not by the VNIC server selection mechanism. For example, let's assume a system administrator is going to take down for maintenance a logical partition that includes the selected VNIC server. Instead of waiting for the VNIC server monitor mechanism 530 to detect when the selected VNIC server goes down and make a change, a system administrator can notify the VNIC server monitor mechanism 530 via the system administrator VNIC server change mechanism 590 that the VNIC server is about to go down, thereby allowing the VNIC server monitor mechanism 530 to request the VNIC server selection mechanism 520 to select the next VNIC server on the prioritized VNIC server list 480 and make the change before the VNIC server is taken down. The system administrator VNIC server change mechanism 590 provides a sort of manual control for a system administrator to determine selection or deselection of a VNIC server.

Figure 6:
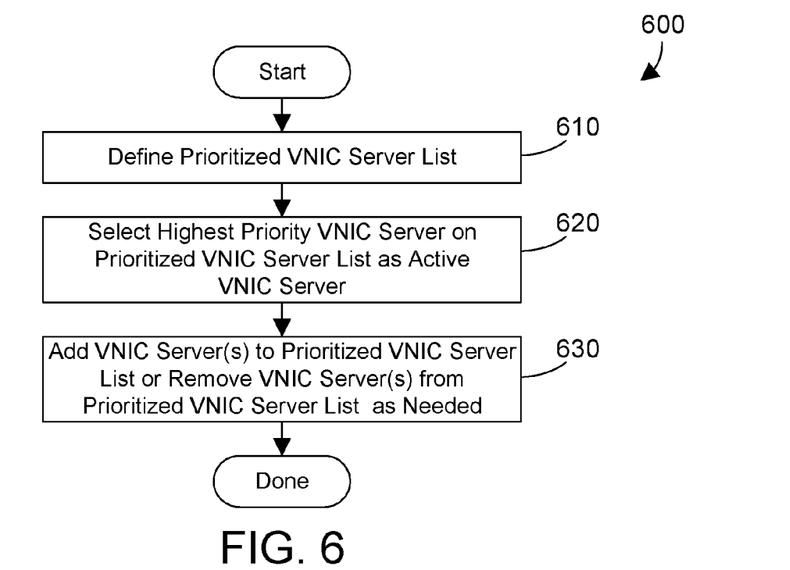
FIG. 6 is a flow diagram of a method for creating and maintaining a prioritized list of VNIC servers.

Referring to FIG. 6, a method 600 is preferably performed by the VNIC server failover mechanism, which could include 125 in FIG. 1, 470 in FIG. 4, and 510 in FIG. 5. The prioritized VNIC server list is defined (step 610). This list may include any suitable number of VNIC servers, but most preferably includes two or more to provide the redundancy of having a backup VNIC server in case the currently-selected VNIC server stops working. The highest priority VNIC server on the VNIC server list is selected as the active VNIC server (step 620). VNIC servers can then be added to or removed from the prioritized VNIC server list as needed (step 630). Method 600 is then done.

Figure 7:
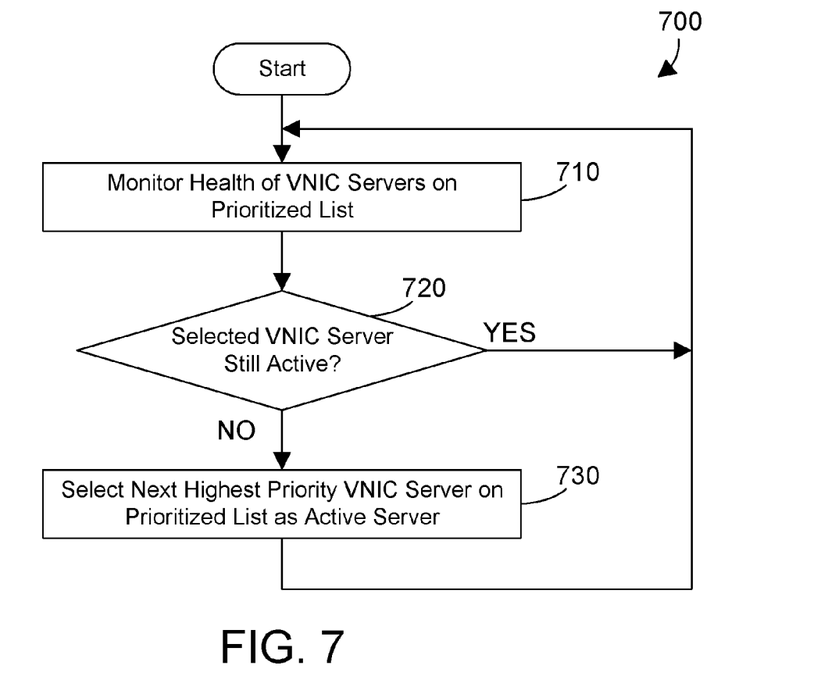
FIG. 7 is a flow diagram of a method for selecting a different VNIC server when the current VNIC server becomes inactive.

Referring to FIG. 7, a method 700 is preferably performed by the VNIC server failover mechanism. The health of VNIC servers on the prioritized list is monitored (step 710). As long as the selected VNIC server is still active (step 720=YES), method 700 loops back to step 710 to continue monitoring. When the selected VNIC server is no longer active (step 720=NO), the next highest priority VNIC server on the prioritized list is selected as the active server (step 730). When the VNIC server is still active in step 720, this means the VNIC server continues to function properly. This monitoring continues, with the next highest priority VNIC server being selected whenever the currently-selected VNIC server becomes inactive by failing to function properly.

Figure 8:
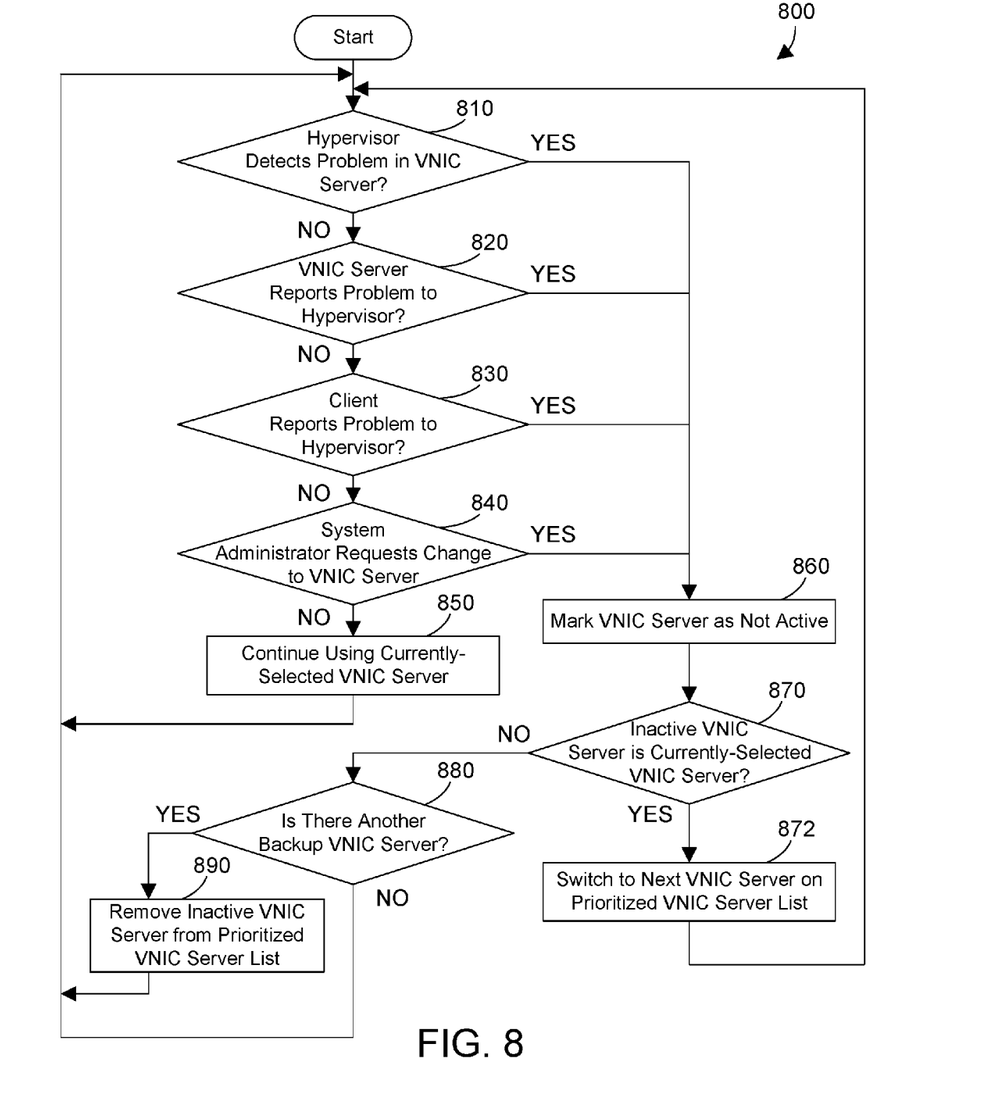
FIG. 8 is a flow diagram of a method to determine when to continue using a currently-selected VNIC server and when to switch to use the next VNIC server on the prioritized list.

Referring to FIG. 8, a method 800 is preferably performed by the VNIC server failover mechanism. When the hypervisor detects a problem in a VNIC server (step 810=YES), the VNIC server is marked as inactive (step 860). When the inactive VNIC server is the currently-selected VNIC server (step 870=YES), a switch is made to the next VNIC server on the prioritized VNIC server list (step 872). When the inactive VNIC server is not the currently-selected VNIC server (step 870=NO), when there is another backup VNIC server (step 880=YES), the inactive VNIC server is removed from the prioritized VNIC server list (step 890). When there is no other backup VNIC server on the prioritized VNIC server list (step 880=NO), the inactive VNIC server is maintained on the prioritized VNIC server list but marked inactive. Thus, should the inactive server become active again, it can be marked as active, and can then be a backup to the then-selected VNIC server.

Method 800 provides similar steps for different conditions, including when the hypervisor detects a problem in the VNIC server (step 810=YES) as discussed above; when the VNIC server reports a problem to the hypervisor (step 820=YES); when the client reports a problem to the hypervisor (step 830=YES); or when a system administrator requests a change to a VNIC server (step 840=YES). When the answer to all of the questions in 810, 820, 830 and 840 is No, the currently-selected VNIC server continues to be used (step 850). Method 800 thus shows one suitable implementation for changing VNIC servers according to various conditions to use a backup VNIC server on the prioritized VNIC server list.

Figure 9:
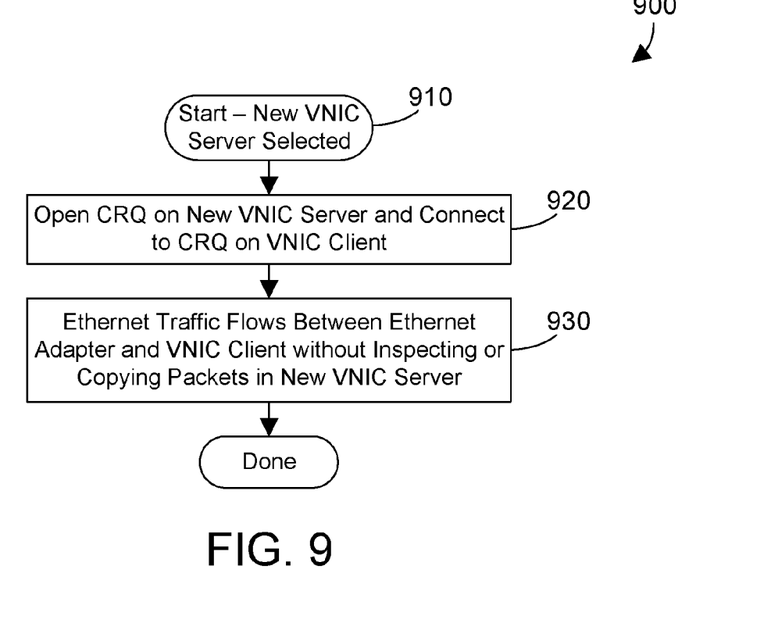
FIG. 9 is a flow diagram of a method for switching in a new VNIC server to an existing VNIC client.

When describing the dedicated VNIC system shown in FIG. 2 and described in the flow diagram in FIG. 3, the advantage when compared to Shared Ethernet Adapter is in step 350 in FIG. 3, where Ethernet traffic flows between the Ethernet adapter and the VNIC client without inspecting or copying packets in the VNIC server. The same advantage can be obtained for the system 400 shown in FIG. 4 that includes multiple VNIC servers on a prioritized list. Referring to FIG. 9, method 900 starts when a new VNIC server is selected (step 910). The CRQ on the new VNIC client is opened and connected to the CRQ on the VNIC client (step 920). This may require closing the existing CRQ on the VNIC client and opening the CRQ again. At this point, Ethernet traffic flows between the Ethernet adapter and the VNIC client without inspecting or copying packets in the new VNIC server (step 930). The new VNIC server thus becomes a conduit through which the network traffic passes without actively inspecting or copying packets, thereby providing the same advantage as the dedicated VNIC system 200 shown in FIG. 2 while still providing redundant backup of VNIC servers as shown in FIG. 4 and described above.

Figure 10:
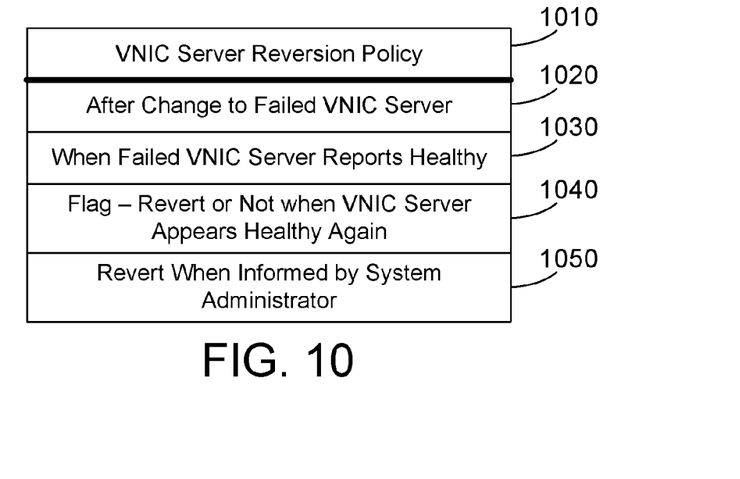
FIG. 10 is a diagram of a table showing possible criteria that could be specified in a VNIC server reversion policy.

Referring back to FIG. 8, let's assume the hypervisor detects a problem in the VNIC server (step 810=YES), marks the VNIC server as inactive in step 860, determines the inactive VNIC server is the currently-selected VNIC server (step 870=YES), and in response, switches to the next VNIC server on the prioritized VNIC server list (step 872). At this point we have a VNIC server that was previously functioning properly, but is no longer functioning properly. How does the VNIC server failover mechanism know when the VNIC server that stopped working might be working again? This can be a function of a suitable policy that is defined to address this issue. Referring to FIG. 10, a VNIC server reversion policy 1010 can include any suitable criteria for determining when to consider reverting to use a VNIC server that was previously functioning properly but stopped. Examples of suitable criteria shown in FIG. 10 include after a change to the failed VNIC server 1020. For example, if the VNIC server stops working, the system administrator could make a change to allocate more memory or CPUs to the VNIC server that stopped working in an attempt to fix the issue that led to the VNIC server no longer working. After the change to the failed VNIC server is made, the VNIC server failover mechanism can then determine basically to "try again" by making the VNIC server active on the prioritized VNIC server list. When a failed VNIC server now reports it is healthy 1030, the VNIC server could be made active on the prioritized VNIC server list. A flag could be defined at 1040 that determines whether to revert or not when a VNIC server appears healthy again. Reversion to the failed VNIC server can also be made as a result of being informed by a system administrator at 1050 the failed server is now working. The VNIC server reversion policy 1010 is shown in FIG. 10 to illustrate there are many suitable criteria that could be defined to determine when to revert to use a previously-failed VNIC server, including many others not shown in FIG. 10.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Providing server-side failover of dedicated VNIC servers as disclosed herein provides multiple benefits. First, there are no code changes required to the VNIC client. Second, the VNIC client's "owner" doesn't need to do any in-partition configuration to take advantage of this new failover capability. Changes to the prioritized list of servers have no impact on the VNIC client at all. There are other fault-tolerance configurations that one can use with VNIC, but they require configuration of the VNIC client. The server-side failover of dedicated VNIC servers disclosed herein provides failover in a cloud-friendly manner, providing a single point of configuration management in the client, without requiring any changes to the existing VNIC client code.

Virtual Network Interface Connection (VNIC) is a client-server protocol that virtualizes access to a single physical Ethernet network adapter. "Dedicated VNIC" describes a configuration in which a VNIC server is connected to a single VNIC client via a command/response queue (CRQ), allowing minimal overhead when communicating between the client and the Ethernet network adapter. A VNIC server failover mechanism includes multiple VNIC servers on a prioritized list. The top VNIC server on the prioritized list is selected to serve a VNIC client when a command/response queue (CRQ) is opened by the client. When the selected VNIC server stops working, the VNIC server failover mechanism selects the next VNIC client in the prioritized list as the active VNIC server, and establishes a connection to the VNIC client's CRQ. In this manner, recovery of a failure in a VNIC server is done in a way that does not require any changes to the VNIC client.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. A computer-implemented method executed by at least one processor for managing virtualized network communications in a computer system including a physical network adapter, the method comprising:
   using a partition manager to define a plurality of logical partitions on the computer system and to manage resources for the plurality of logical partitions;
   running an application in a first of the plurality of logical partitions;
   running a virtual network interface (VNIC) client in the first logical partition under control of the partition manager, the VNIC client handling network communications for the application;
   running a first VNIC server in a second of the plurality of logical partitions under control of the partition manager having a first connection to the physical network adapter and having the ability to connect with the VNIC client when the VNIC client opens a command/response queue (CRQ);
   running a second VNIC server in a third of the plurality of logical partitions under control of the partition manager having a second connection to the physical network adapter and having the ability to connect with the VNIC client when the VNIC client opens the CRQ;
   selecting one of the first and second VNIC servers to connect with the VNIC client when the VNIC client opens the CRQ;
   monitoring the selected VNIC server;
   when the selected VNIC server is no longer functioning properly, selecting the other of the first and second VNIC servers to connect with the CRQ of the VNIC client.

2. The method of claim 1 further comprising:
   maintaining a prioritized VNIC server list including the first VNIC server in a first position and the second VNIC server in a second position;
   selecting the highest-priority VNIC server on the prioritized VNIC server list as the currently-selected VNIC server to connect with the VNIC client when the VNIC client opens the CRQ;
   monitoring the currently-selected VNIC server; and
   when the currently-selected VNIC server is no longer functioning properly, selecting the next VNIC server on the prioritized VNIC server list to connect with the CRQ of the VNIC client.

3. The method of claim 2 further comprising connecting the CRQ of the VNIC client to a CRQ of the next VNIC server to provide a dedicated VNIC connection between the VNIC client and the next VNIC server.

4. The method of claim 1 wherein the currently-selected VNIC server is no longer functioning properly when the partition manager detects a problem in the currently-selected VNIC server.

5. The method of claim 1 wherein the currently-selected VNIC server is no longer functioning properly when the currently-selected VNIC server reports a problem to the partition manager.

6. The method of claim 1 wherein the currently-selected VNIC server is no longer functioning properly when the VNIC client reports a problem.

7. The method of claim 1 further comprising selecting a different VNIC server when a message is received from a system administrator to change VNIC servers.

8. A computer-implemented method executed by at least one processor for managing virtualized network communications in a computer system including a physical network adapter, the method comprising:
   using a partition manager to define a plurality of logical partitions on the computer system and to manage resources for the plurality of logical partitions;
   running an application in a first of the plurality of logical partitions;
   running a virtual network interface (VNIC) client in the first logical partition under control of the partition manager, wherein the VNIC client handles network communications for the application;
   running a first VNIC server in a second of the plurality of logical partitions under control of the partition manager having a first connection to the physical network adapter and having the ability to connect with the VNIC client when the VNIC client opens a command/response queue (CRQ);
   running a second VNIC server in a third of the plurality of logical partitions under control of the partition manager having a second connection to the physical network adapter and having the ability to connect with the VNIC client when the VNIC client opens a command/response queue (CRQ);
   maintaining a prioritized VNIC server list including the first VNIC server and the second VNIC server;
   selecting the highest-priority VNIC server on the prioritized VNIC server list as the currently-selected VNIC server to connect with the VNIC client when the VNIC client opens the CRQ to provide a dedicated VNIC connection between the VNIC client and the selected VNIC server;

monitoring currently-selected VNIC server;

when the currently-selected VNIC server is no longer functioning properly, selecting the next VNIC server on the prioritized VNIC server list to connect with the CRQ of the VNIC client to provide a dedicated VNIC connection between the VNIC client and the next VNIC server;

wherein the currently-selected VNIC server is no longer functioning properly under any of the following conditions:

the partition manager detects a problem in the currently-selected VNIC server;

the currently-selected VNIC server reports a problem to the partition manager; and the VNIC client reports a problem.

9. The method of claim 8 further comprising selecting a different VNIC server when a message is received from a system administrator to change VNIC servers.

* * * * *

UNITED STATES PATENT AND TRADEMARK OFFICE
CERTIFICATE OF CORRECTION

| | | |
|---|---|---|
| PATENT NO. | : 9,552,264 B1 | Page 1 of 1 |
| APPLICATION NO. | : 15/057780 | |
| DATED | : January 24, 2017 | |
| INVENTOR(S) | : DeVilbiss et al. | |

It is certified that error appears in the above-identified patent and that said Letters Patent is hereby corrected as shown below:

On the Title Page

Item (72) Inventors should read:

(72) Inventors: Colin R. DeVilbiss, Rochester, MN (US); Charles S. Graham, Rochester MN (US); Nicholas J. Rogness, Rochester, MN (US); Kristopher C. Whitney, Rochester, MN (US); Xiaohan Qin, Austin, TX (US)

Signed and Sealed this
Third Day of October, 2017

Joseph Matal
*Performing the Functions and Duties of the*
*Under Secretary of Commerce for Intellectual Property and*
*Director of the United States Patent and Trademark Office*